United States Patent Office

2,762,843
Patented Sept. 11, 1956

2,762,843

SYNTHESIS OF GUANIDINE FROM $SO_2$, $CO_2$, AND $NH_3$

Jean Louis Boivin, Quebec, Quebec, Canada, assignor to Her Majesty the Queen in the right of Canada represented by the Minister of National Defence, Ottawa, Ontario, Canada No Drawing. Application June 17, 1952,
Serial No. 294,061

Claims priority, application Canada January 12, 1952

2 Claims. (Cl. 260—564)

The present invention relates to the production of guanidine values.

It is an object of this invention to produce guanidine in a process adapted to be continuously operated and in values by the utilization of readily available raw materials which substantially all of the reactants are consumed.

It has now been found that $NH_3$, $CO_2$ and $SO_2$ may be reacted to produce guanidine sulphate or guanidine sulphamate. The reaction occurred readily at moderately elevated temperatures provided that the gaseous reactants are employed in substantially the proper proportions.

Although it is preferred to carry out the reaction by using the starting materials in a gaseous state, it is also possible to carry out the process in an efficient manner by employing materials which, on decomposition, produce the three gases.

It is believed that the reaction between $NH_3$, $CO_2$ and $SO_2$ takes place in the following manner, the first equation illustrates the preparation of guanidine sulphamate and the second equation the production of the sulphate value:

(1)
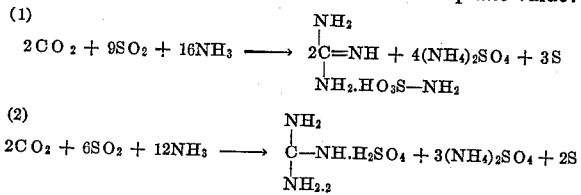

(2)

$$2CO_2 + 6SO_2 + 12NH_3 \longrightarrow \underset{\underset{NH_{2\cdot 2}}{|}}{\overset{NH_2}{|}}{C}-NH.H_2SO_4 + 3(NH_4)_2SO_4 + 2S$$

The reaction shown by Equations 1 and 2 may be carried out over a wide range of pressures but generally proceeds more rapidly as the pressure is increased. At atmospheric pressure the reaction proceeds so slowly that no appreciable amount of guanidine values are formed. It is considered that the threshold pressure at which economical yields of guanidine values are obtained is at 200 lbs. per square inch. The upper value of pressure will be governed by the structural limitations of the available equipment. Higher yields in a shorter period of time are obtained with higher pressures subject to the limitations mentioned above. It is preferred to operate in a range of 200 to 400 lbs. per square inch.

The reactions disclosed in Equations 1 and 2 are preferably carried out at a temperature within the range 225° C. to 400° C. At temperatures much in excess of 400° C. decomposition of the guanidine values occurs. At temperatures below 280° C. guanidine sulphamate is produced. It has been found that in order to produce the sulphate value it is necessary to operate at a temperature in excess of 300° C.

Although the reaction may be carried out using the reactants in the theoretical proportions called for by Equations 1 and 2 it is preferred to have an excess of $NH_3$ present and, in this connection, it has been found, for efficient results, that 2 mols of $NH_3$ should be used for each mol of $SO_2$. The most desirable molar relationship between the reactants is $CO_2$ 1 mol, $SO_2$ 3 mols and $NH_3$ 7 mols. As all of the reactants are gaseous the process is readily adaptable for continuous operation such as in a heated cubular reactor which offers considerable advantage from the economical standpoint over a batch process. In addition, the unreacted gases may be recovered by recycling them into the reactor. The means by which the recycling can be accomplished are not disclosed herein as conventional engineering means may be employed.

The terms "sulphur dioxide," "ammonia" and "carbon dioxide" are used in this description to refer to the individual compounds in either the solid, liquid or gaseous state.

The yield of guanidine values and the formation of undesirable compounds may be affected by several factors. The presence of moisture in the reactant will tend to produce undesirable products and, for this reason, it is advisable that the reactant be anhydrous.

The practice of this invention will be better understood by reference to the following illustrative examples:

Example I

In a 100 ml. autoclave was placed ammonia (15 parts), frozen sulphur dioxide (19.2 parts) and solid carbon dioxide (4.4 parts). The reaction products were heated at 275° C. for 30 minutes at a pressure of 300 p. s. i. g. The reaction products were extracted with liquid ammonia. The liquid ammonia filtrate was evaporated and the residue crystallized from ethanol, M. P. 128–130° C. Yield of guanidine sulphamate, 6.2 parts or 40% yield from carbon dioxide. The material insoluble in liquid ammonia was dissolved in water and sulphur was filtered off. Yield, 6.4 parts or 33% from sulphur dioxide.

The same results were obtained with ammonium carbamate.

Example II

The same ingredients were added in the same proportions as above and the mixture was heated at 300° C. for half an hour. A maximum pressure of 500 p. s. i. g. was developed. The reaction products were treated with liquid ammonia, no guanidine was found in the liquid ammonia extract. The residue which contained guanidine sulphate was dissolved in water. The sulphur was filtered off. Yield, 6.4 parts or 33% from sulphur dioxide. By transforming crude guanidine sulphate into the picrate or nitrate, it was found to give 38% yield of guanidine sulphate.

The same results were obtained with ammonium carbamate.

I claim:

1. A process of preparing a guanidine sulfate comprising reacting carbon dioxide, ammonia and sulphur dioxide at a temperature within the range of substantially 300°–400° C. and at a pressure in excess of 200 p. s. i. employing a molecular ratio of substantially 1 mol of $CO_2$: 3 mols of $SO_2$: 7 mols of $NH_3$.

2. A continuous process for preparing a guanidine sulfate comprising passing carbon dioxide, ammonia, and sulphur dioxide in a ratio of substantially 1 mol of $CO_2$: 3 mols of $SO_2$: 7 mols of $NH_3$ and at a pressure in excess of 200 p. s. i. through a reactor maintained at a temperature within the range of substantially 300°–400° C., cooling said reaction mixture to solidify the guanidine sulfate so produced sufficiently to permit its separation therefrom, separating said sulfate from said reaction mixture, and recirculating said gases.

References Cited in the file of this patent

UNITED STATES PATENTS

| | | |
|---|---|---|
| 2,464,247 | Mackay | Mar. 15, 1949 |
| 2,498,538 | Frejacques | Feb. 21, 1950 |
| 2,515,244 | Mackay | July 18, 1950 |
| 2,527,315 | Mackay | Oct. 24, 1950 |
| 2,550,659 | Vingee | Apr. 24, 1951 |
| 2,632,771 | White | Mar. 24, 1953 |
| 2,653,976 | Mackay | Sept. 29, 1953 |
| 2,676,984 | Marsh | Apr. 27, 1954 |

FOREIGN PATENTS

| | | |
|---|---|---|
| 583,504 | Great Britain | Dec. 19, 1946 |